United States Patent
Li et al.

(10) Patent No.: US 9,807,385 B2
(45) Date of Patent: Oct. 31, 2017

(54) SIMPLIFICATION OF MODE DEPENDENT INTRA SMOOTHING

(71) Applicants: Futurewei Technologies, Inc., Plano, TX (US); Santa Clara University, Santa Clara, CA (US)

(72) Inventors: Guichun Li, Mountain View, CA (US); Lingzhi Liu, San Jose, CA (US); Nam Ling, San Jose, CA (US); Jianhua Zheng, Beijing (CN); Chen-Xiong Zhang, Plano, TX (US); Li Song, Shanghai (CN)

(73) Assignees: Futurewei Technologies, Inc., Plano, TX (US); Santa Clara University, Santa Clara, CA (US)

( * ) Notice: Subject to any disclaimer, the term of this patent is extended or adjusted under 35 U.S.C. 154(b) by 854 days.

(21) Appl. No.: 13/744,827

(22) Filed: Jan. 18, 2013

(65) Prior Publication Data
US 2013/0188702 A1    Jul. 25, 2013

Related U.S. Application Data

(60) Provisional application No. 61/588,355, filed on Jan. 19, 2012.

(51) Int. Cl.
*H04N 7/12* (2006.01)
*H04N 19/50* (2014.01)
(Continued)

(52) U.S. Cl.
CPC ..... *H04N 19/00569* (2013.01); *H04N 19/117* (2014.11); *H04N 19/157* (2014.11);
(Continued)

(58) Field of Classification Search
USPC .......... 375/240.01–240.29; 382/238
See application file for complete search history.

(56) References Cited

U.S. PATENT DOCUMENTS

| | | | |
|---|---|---|---|
| 9,008,175 B2* | 4/2015 | Van Der Auwera et al. | 375/240.12 |
| 2008/0089417 A1 | 4/2008 | Bao | |

(Continued)

FOREIGN PATENT DOCUMENTS

| | | |
|---|---|---|
| CN | 101523922 A | 9/2009 |
| CN | 102256125 A | 11/2011 |

OTHER PUBLICATIONS

Van Der Auwera, G., et al., "CE6.e: Report on Mode-Dependent Intra Smoothing Modifications," Joint Collaborative Team on Video Coding (JCT-VC) of ITU-T SG16 WP3 and ISO/IEC JTC1/SC29/WG11, 6th Meeting, Torino, JCTVC-F126, Jul. 14-22, 2011, 6 pages.

(Continued)

*Primary Examiner* — Gims Philippe
(74) *Attorney, Agent, or Firm* — Futurewei Technologies, Inc.

(57) ABSTRACT

An apparatus comprising a processor configured to determine whether to apply an intra smoothing filter for a prediction unit (PU) based on a lookup table (LUT), wherein the LUT comprises data indicating the intra smoothing filter should not be applied for any PU with a block size of 8×8 pixels and associated with directional prediction mode. The disclosure also includes a method comprising generating reference samples, determining a size of a PU block, and selecting the reference samples based on PU block size, wherein filtered reference samples are not selected for PU blocks with a size of 8×8 pixels and associated with directional prediction mode.

14 Claims, 3 Drawing Sheets

(51) Int. Cl.
*H04N 19/593* (2014.01)
*H04N 19/117* (2014.01)
*H04N 19/157* (2014.01)
*H04N 19/18* (2014.01)

(52) U.S. Cl.
CPC ............. *H04N 19/18* (2014.11); *H04N 19/50* (2014.11); *H04N 19/593* (2014.11)

(56) References Cited

U.S. PATENT DOCUMENTS

| | | | |
|---|---|---|---|
| 2011/0170594 | A1 | 7/2011 | Budagavi |
| 2011/0274158 | A1 | 11/2011 | Fu |
| 2012/0147967 | A1* | 6/2012 | Panchal et al. .......... 375/240.17 |
| 2012/0287995 | A1* | 11/2012 | Budagavi ................. 375/240.12 |
| 2012/0320974 | A1 | 12/2012 | Li et al. |
| 2013/0272623 | A1* | 10/2013 | Jeon et al. ................... 382/238 |
| 2014/0086323 | A1* | 3/2014 | Chuang et al. .......... 375/240.12 |

OTHER PUBLICATIONS

Bross, B., et al., "WD5: Working Draft 5 of High-Efficiency Video Coding," Joint Collaborative Team on Video Coding (JCT-VC) of ITU-T SG16 WP3 and ISO/IEC JTC1/SC29/WG11, 7th Meeting, Geneva, CH, JCTVC-G1103_d0, Nov. 21-30, 2011, 215 pages.

Li, G., et al., "Simplification of Mode Dependent Intra Smoothing," Joint Collaborative Team on Video Coding (JCT-VC) of ITU-T SG16 WP3 and ISO/IEC JTC1/SC29/WG11, 8th Meeting, San Jose, CA, JCTVC-H0465, Feb. 1-10, 2012, 3 pages.

Foreign Communication From a Counterpart Application, PCT Application PCT/2013/022116, International Search Report dated May 8, 2013, 4 pages.

Foreign Communication From a Counterpart Application, PCT Application PCT/2013/022116, Written Opinion dated May 8, 2013, 11 pages.

"Series H: Audiovisual and Multimedia Systems, Infrastructure of Audiovisual Services—Coding of Moving Video, Advanced Video Coding for Generic Audiovisual Services," ITU-T H.264, Nov. 2007, 564 pages.

Sugimoto, K., et al., "LUT-Based Adaptive Filtering on Intra Prediction Samples," 4th Meeting of Joint Collaborative Team on Video Coding (JCT-VC) of ITU-T SG16 WP3 and ISO/IEC JTC1/SC29/WG11, Daegu, KR, Jan. 20-28, 2011, Document JCTVC-D109, 4 pages.

Sugimoto, K., et al., "CE6.f: Verification Report on LUT-Based Adaptive Filtering on Intra Prediction Samples," 5th Meeting of Joint Collaborative Team on Video Coding (JCT-VC) of ITU-T SG16 WP3 and ISO/IEC JTC1/SC29/WG11, Geneva, Mar. 16-23, 2011, Document JCTVC-E069, 6 pages.

Wiegand, T., et al., "WD3: Working Draft 3 of High-Efficiency Video Coding," 5th Meeting of Joint Collaborative Team on Video Coding (JCT-VC) of ITU-T SG16 WP3 and ISO/IEC JTC1/SC29/WG11, Geneva, Mar. 16-23, 2011, Document JCTVC-E603, 233 pages.

Van der Auwera, G., et al., "CE6.e: Mode-Dependent Intra Smoothing Modifications," 6th Meeting of Joint Collaborative Team on Video Coding (JCT-VC) of ITU-T SG16 WP3 and ISO/IEC JTC1/SC29/WG11, Torino, Jul. 14-22, 2011, Document JCTVC-F126, 6 pages.

Bross, B., et al., "WD5: Working Draft 5 of High-Efficiency Video Coding," 7th Meeting of Joint Collaborative Team on Video Coding (JCT-VC) of ITU-T SG16 WP3 and ISO/IEC JTC1/SC29/WG11, Geneva, Nov. 21-30, 2011, Document JCTVC-G1103_d9, 237 pages.

Bossen, F., "Common Test Conditions and Software Reference Configurations," 7th Meeting of Joint Collaborative Team on Video Coding (JCT-VC) ITU-T SG16 WP3 and ISO/IEC JTC1/SC29/WG11, Geneva, Nov. 21-30, 2011, Document JCTVC-G1200, 4 pages.

* cited by examiner

SIMPLIFICATION OF MODE DEPENDENT INTRA SMOOTHING

CROSS-REFERENCE TO RELATED APPLICATIONS

The present application claims priority to U.S. Provisional Patent Application No. 61/588,355 filed Jan. 19, 2012 by Guichun Li et al. and entitled "Simplification of Mode Dependent Intra Smoothing", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short film can be substantial, which may result in difficulties when the data is to be streamed or otherwise communicated across a communications network with limited bandwidth capacity. Thus, video data is generally compressed prior to being communicated across modern day telecommunications networks. Video compression devices often use software and/or hardware at the source to code the video data prior to transmission, thereby decreasing the quantity of data needed to represent digital video images. The compressed data is then received at the destination by a video decompression device that decodes the video data. With limited network resources and ever increasing demands of higher video quality, improved compression and decompression techniques that improve image quality without substantially increasing bit-rates are desirable.

SUMMARY

In one embodiment, the disclosure includes an apparatus comprising a processor configured to determine whether to apply an intra smoothing filter for a prediction unit (PU) based on a lookup table (LUT), wherein the LUT comprises data indicating the intra smoothing filter should not be applied for any PU with a block size of 8×8 pixels and associated with directional prediction mode.

In another embodiment, the disclosure includes a method comprising generating reference samples, determining a size of a PU block, and selecting the reference samples based on PU block size, wherein filtered reference samples are not selected for PU blocks with a size of 8×8 pixels and associated with directional prediction mode.

In yet another embodiment, the disclosure includes an apparatus comprising a memory comprising instructions, and a processor configured to execute the instructions by generating reference samples, determining a size of a PU block, and selecting between filtered reference samples and unfiltered reference samples based on PU block size, wherein filtered reference samples are not selected for PU blocks with a size of 8×8 pixels and associated with directional prediction mode.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
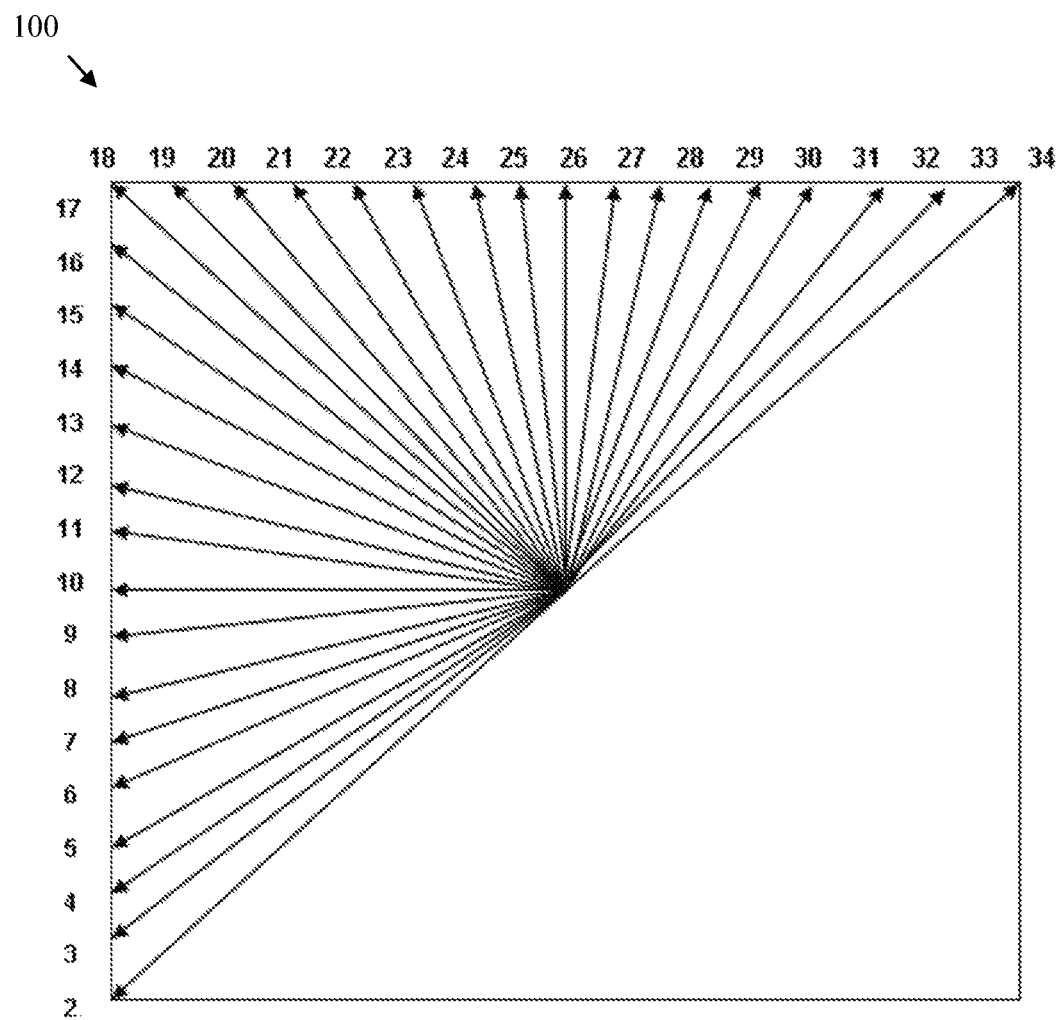
FIG. 1 is a schematic diagram of a plurality of intra prediction modes.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Typically, video media involves displaying a sequence of still images or frames in relatively quick succession, thereby causing a viewer to perceive motion. Each frame may comprise a plurality of picture elements or pixels, each of which may represent a single reference point in the frame. During digital processing, each pixel may be assigned an integer value (e.g., 0, 1, . . . or 255) that represents an image quality or characteristic, such as luminance or chrominance, at the corresponding reference point. Typically, groups of pixels (e.g., macroblocks, coding units (CU) or prediction units (PU)) within a single frame may be substantially correlated with other macroblocks within the same frame such that pixel values across some macroblocks may vary only slightly and/or exhibit repetitious textures. Modern methods of video-compression exploit these spatial correlations using various techniques which may be known collectively as intra-frame prediction (or in short as intra prediction). Intra-frame prediction may reduce spatial redundancies between adjacent and/or neighboring macroblocks (also referred to herein as blocks) in the same frame, thereby compressing the video data without greatly reducing image quality. Different forms of intra-frame prediction have been described by various conventional video/image coding standards, such as the International Telecommunications Union (ITU) Telecommunications Standardization Sector (ITU-T) H.264 (hereinafter, H.264), which is incorporated herein by reference as if reproduced in its entirety.

In practice, intra-frame predication may be implemented by video encoders/decoders (codecs) to interpolate a predicted block from one or more previously coded/decoded neighboring blocks, thereby creating an approximation of the current block. Hence, the encoder and decoder may interpolate the predicted block independently, thereby enabling a substantial portion of a frame and/or image to be reconstructed from the communication of a relatively few number of reference blocks, e.g., blocks positioned in (and extending from) the upper-left hand corner of the frame. However, intra-frame prediction alone may not reproduce an image of sufficient quality for modern video, and consequently an error correction message, e.g., a residual message, may be communicated between the encoder and decoder to correct differences between the predicted block and the current block. For instance, an encoder may subtract the predicted block from the current block to produce a residual block, which then may be transformed, quantized, and scanned before being coded into the coded data stream. Upon reception of the coded data stream, a decoder may add the reconstructed residual block to the independently generated predicted block to recreate the current block. Although the recreated current block may be an imperfect version of the original current block, e.g., due to the lossy nature of intra-frame coding compression, their differences may be hardly perceptible to the human eye. Thus, substantial bit savings may be derived without significantly degrading the quality of the reconstructed image.

The residual block may comprise few differences between the predicted block and the current block, and therefore many of the residual block's discrete values, e.g., pixel data, may comprise zero and/or near-zero coefficients, e.g., in areas where the predicted block is identical and/or near-identical to the current block. Furthermore, transformation, quantization, and/or scanning of the residual block may remove many of the zero and/or near-zero coefficients from the data stream, thereby resulting in further compression of the video data. Consequently, coding efficiencies may result from more accurate predictions of the original image. To harness these coding efficiencies, conventional video/image coding standards may improve prediction accuracy by using a plurality of prediction modes during intra-frame prediction, e.g., each of which may generate a unique texture. For example, the proposed High Efficiency Video Coding (HEVC) video compression standard (also known as H.265) may employ various prediction modes in a Unified Intra Prediction (UIP) scheme.

FIG. 1 illustrates a schematic diagram of a plurality of intra prediction modes 100 used in the HEVC UIP scheme. For luminance blocks, the intra prediction modes 100 may comprise up to 36 intra prediction modes, which may include three non-directional modes and 33 directional modes. The non-directional modes may comprise a planar prediction mode, a mean (DC) prediction mode, and a chroma from luma (LM) prediction mode. The planar prediction mode may perform predictions by assuming a block amplitude surface with a horizontal and vertical slope derived from the boundary of the block. The DC prediction mode may perform predictions by assuming a flat block surface with a value matching the mean value of the block boundary. The LM prediction mode may perform predictions by assuming a choma value for the block matches the luma value for the block. The directional modes may perform predictions based on adjacent blocks as shown in FIG. 1.

In use, an encoder may select a prediction mode that generates the most accurate prediction for each current block. For example, the sum of absolute errors (SAE) may be calculated for each mode in the intra prediction modes 100, and the one with the least SAE may be selected. In general, more accurate intra prediction may result from a larger number of intra prediction modes. For example, recent research has shown that conventions using 36 intra-frame prediction modes, such as the intra prediction modes 100, may more accurately predict complex textures than conventions using fewer prediction modes, such as H.264, which may use only 9 intra prediction modes. While 36 intra prediction modes are disclosed, it should be noted that, depending on block-size and/or the intra prediction scheme, any other suitable number of prediction modes may be used.

A plurality of intra smoothing schemes may be employed to increase prediction accuracy. For example, in one scheme, the codec may determine whether to apply a smoothing filter and which smoothing filter to apply based on the mode of the intra-frame prediction for each current block. Specifically, the smoothing filter may be applied to reference samples, which may then be used for intra-frame prediction. This scheme may be referred to as Mode Dependent Intra Smoothing (MDIS). There also exists a plurality of MDIS methods. For example, one MDIS method may explicitly signal whether the prediction samples are filtered. The encoder may make the smoothing decision by testing the Rate-Distortion (RD) cost for all potential intra prediction modes. In an alternative MDIS method, the RD cost of filtered or unfiltered prediction samples may only be tested for the best intra prediction mode, leading to a relatively faster MDIS process.

Block-based intra coding in compression standards, such as Advanced Video Coding (AVC), Key Technical Areas (KTA) and HEVC Test Models (HM), etc., may use square blocks as prediction units (PU). A prediction unit may refer to an elementary unit for prediction. A square PU comprises a horizontal side (width) that has the same number of pixels as its vertical side (height). A MDIS scheme based on square PUs may determine the ON/OFF status of a filter and/or its type according to a lookup table (LUT). Table 1 shows an exemplary LUT, which may be used in HM 5.0 according to "WD5: Working Draft 5 of High-Efficiency Video Coding," by Benjamin Bross, et. al, in the *7th Meeting of the Joint Collaborative Team on Video Coding* (JCT-VC) of ITU-T SG16 WP3 and ISO/IEC JTC1/SC29/WG11, Geneva, 21-30 Nov. 2011, Doc. JCTVC-G1103_d9, which is hereby incorporated by reference. Table 1 may comprise a plurality of filter decision entries, and each entry may be indexed by a square PU size and intra prediction mode. The rows correspond to potential sizes of a square PU in intra prediction, where each row represents a unique square PU size (e.g. 4×4, 8×8, etc.). The columns may correspond to 36 prediction modes that may be used in a UIP scheme. Column 0 may represent planar mode, column 1 may represent DC mode, columns 2-34 may represent the directional intra prediction modes where each column may represent an directional prediction mode numbered according to FIG. 1 (from 2-34), and column 35 may represent LM mode. The entries in Table 1 may correspond to the filter decisions and represent the numerical assignment of a decision. For each filter decision herein, a value of 1 may indicate that the associated intra smoothing filter is turned on, and a value of 0 may indicate that the intra smoothing filter is turned off. For example, for a 8×8 square PU with a directional prediction mode of 4, intra smoothing may be performed; for a 32×32 square PU with a directional prediction mode of 5, intra smoothing may not be performed, etc.

TABLE 1

A lookup table (LUT) used in the MDIS of HM 5.0

|       | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|-------|---|---|---|---|---|---|---|---|---|---|----|----|----|----|----|----|----|----|----|----|----|----|----|----|
| 4 × 4 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  |
| 8 × 8 | 1 | 0 | 0 | 0 | 1 | 0 | 0 | 1 | 0 | 0 | 1  | 0  | 0  | 0  | 0  | 0  | 0  | 0  | 0  | 0  | 0  | 0  | 0  | 0  |
| 16 × 16 | 1 | 0 | 0 | 0 | 1 | 1 | 1 | 1 | 1 | 1 | 1  | 1  | 1  | 1  | 1  | 1  | 1  | 1  | 1  | 1  | 1  | 1  | 0  | 0  |

TABLE 1-continued

A lookup table (LUT) used in the MDIS of HM 5.0

| | | | | | | | | | | | | | | | | | | | | | | | |
|---|---|---|---|---|---|---|---|---|---|---|---|---|---|---|---|---|---|---|---|---|---|---|---|
| 32 × 32 | 1 | 0 | 0 | 0 | 1 | 1 | 1 | 1 | 1 | 1 | 1 | 1 | 1 | 1 | 1 | 1 | 1 | 1 | 1 | 1 | 1 | 1 | 1 |
| 64 × 64 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| | 24 | 25 | 26 | 27 | 28 | 29 | 30 | 31 | 32 | 33 | 34 | 35 |
|---|---|---|---|---|---|---|---|---|---|---|---|---|
| 4 × 4 | 0 | 0 | 0 | 0 | 0 | 0 | 0 | 0 | 0 | 0 | 0 | 0 |
| 8 × 8 | 0 | 0 | 0 | 0 | 0 | 0 | 0 | 0 | 0 | 0 | 0 | 0 |
| 16 × 16 | 1 | 1 | 1 | 1 | 1 | 1 | 0 | 0 | 1 | 1 | 1 | 0 |
| 32 × 32 | 1 | 1 | 1 | 1 | 1 | 1 | 1 | 1 | 1 | 1 | 1 | 0 |
| 64 × 64 | 0 | 0 | 0 | 0 | 0 | 0 | 0 | 0 | 0 | 0 | 0 | 0 |

As illustrated in Table 1, only square PUs are used in this MDIS LUT. It should be noted that for different intra prediction schemes in different video coding conventions, different LUTs may be designed. While Table 1 only shows the ON/OFF status of intra smoothing filters, other LUTs, in addition to the ON/OFF status, may include the selection of a plurality of filter types (e.g. 1=type 1, 2=type 2). Any suitable type of filter, such as a finite impulse response (FIR) filter, an infinite impulse response (IIR) filter, and an intra-coefficient based filter, etc., may be implemented for intra smoothing. For additional examples of LUTs and implementation of intra smoothing filters, please refer to reports entitled: "LUT-Based Adaptive Filtering on Intra Prediction Samples," by Kazuo Sugimoto, Shun-ichi Sekiguchi, Akira Minezawa, Kazuhisa Iguchi, and Yoshiaki Shishikui in the 4th *Meeting of the Joint Collaborative Team on Video Coding* (JCT-VC) of ITU-T SG16 WP3 and ISO/IEC JTC1/SC29/WG11, Daegu, KR, 20-28 Jan. 2011, Doc. JCTVC-D109; "CE6.f: Verification Report on LUT-Based Adaptive Filtering on Intra Prediction Samples," by Kazuo Sugimoto, Shun-ichi Sekiguchi, Akira Minezawa, Kazuhisa Iguchi, and Yoshiaki Shishikui in the 5th *Meeting of the Joint Collaborative Team on Video Coding* (JCT-VC) of ITU-T SG16 WP3 and ISO/IEC JTC1/SC29/WG11, Geneva, 16-23 Mar. 2011, Doc. JCTVC-E069; and "CE6.e: Mode-Dependent Intra Smoothing Modifications," by Geert Van der Auwera and Xianglin Wang in the 6th *Meeting of the Joint Collaborative Team on Video Coding* (JCT-VC) of ITU-T SG16 WP3 and ISO/IEC JTC1/SC29/WG11, Torino, 14-22 Jul. 2011, Doc. JCTVC-F126, all of which are hereby incorporated by reference.

The intra smoothing schemes discussed herein may require significant processing power to perform video encoding and/or decoding. The application of smoothing filter(s) for PU blocks in various predictions modes may increase the accuracy of the prediction at the cost of computational complexity, which may result in longer processing time. As such, simplification of an intra smoothing scheme may be beneficial to the coding process as long as such simplification results in an acceptable loss in prediction accuracy and a minimal increase in blocking.

Disclosed herein is a simplified MDIS LUT that may be employed to simplify the MDIS process, which may result in decreased complexity and faster processing with negligible loss in prediction accuracy. Specifically, filtering may be turned off for all directional modes associated with 8×8 square PUs with a negligible loss in prediction accuracy. Further, filtering may also be turned off for planar prediction mode associated with 8×8 square PUs.

Figure 2:
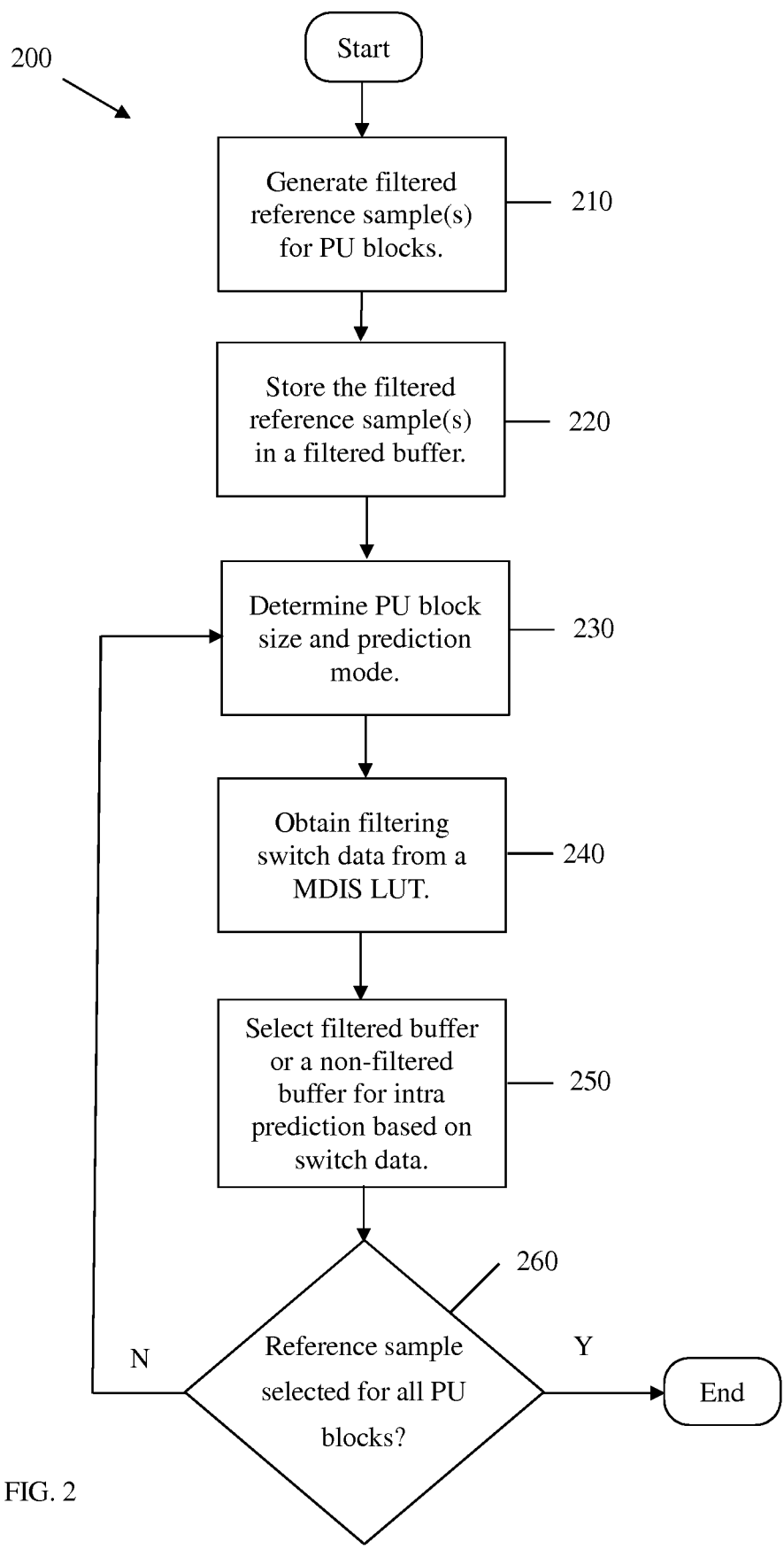
FIG. 2 is a flowchart of an embodiment of a method of selecting a reference sample for intra prediction.

FIG. 2 is a flow chart of an embodiment of a method 200 of selecting a reference sample for intra prediction. At step 210, method 200 may generate filtered reference samples for each PU block. Specifically, the filtered reference samples may be generated by applying a three coefficient (3 tap) smoothing filter to the PU. The filtered reference samples may be stored in a filtered buffer at step 220. At step 230, the method may determine the size (e.g. in pixels) of a specified PU block and the prediction mode associated with the PU block. At step 240, the method 200 may obtain filtering switch data from a MDIS LUT. The MDIS LUT may be substantially similar to the LUT described in Table 1. However, the MDIS LUT used at step 240 may comprise data indicating that an intra smoothing filter should not be applied and/or selected when if the PU block is an 8×8 square block that is associated with a directional prediction mode, as shown in Table 2.

TABLE 2

Simplified MDIS LUT

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 4 × 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8 × 8 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 × 16 | 1 | 0 | 0 | 0 | 1 | 1 | 1 | 1 | 1 | 1 | 1 | 1 | 1 | 1 | 1 | 1 | 1 | 1 | 1 | 1 | 1 | 1 | 0 | 0 |
| 32 × 32 | 1 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 64 × 64 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| | 24 | 25 | 26 | 27 | 28 | 29 | 30 | 31 | 32 | 33 | 34 | 35 |
|---|---|---|---|---|---|---|---|---|---|---|---|---|
| 4 × 4 | 0 | 0 | 0 | 0 | 0 | 0 | 0 | 0 | 0 | 0 | 0 | 0 |
| 8 × 8 | 0 | 0 | 0 | 0 | 0 | 0 | 0 | 0 | 0 | 0 | 0 | 0 |
| 16 × 16 | 1 | 1 | 1 | 1 | 1 | 1 | 0 | 0 | 1 | 1 | 1 | 0 |
| 32 × 32 | 1 | 1 | 1 | 1 | 1 | 1 | 1 | 1 | 1 | 1 | 1 | 0 |
| 64 × 64 | 0 | 0 | 0 | 0 | 0 | 0 | 0 | 0 | 0 | 0 | 0 | 0 |

As shown above, all columns 1-35 are designated as zero, which may indicate that the smoothing filter should not be used for DC mode (e.g. column 1), any directional prediction modes (e.g. columns 2-34), and/or LM mode (e.g. column 35). In the alternative, the LUT may also comprise data indicating that the smoothing filter should not be used for planar mode as shown in Table 3.

TABLE 3

Another Simplified MDIS LUT

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 4 × 4   | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8 × 8   | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 × 16 | 1 | 0 | 0 | 0 | 1 | 1 | 1 | 1 | 1 | 1 | 1 | 1 | 1 | 1 | 1 | 1 | 1 | 1 | 1 | 1 | 1 | 1 | 0 | 0 |
| 32 × 32 | 1 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 64 × 64 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| | 24 | 25 | 26 | 27 | 28 | 29 | 30 | 31 | 32 | 33 | 34 | 35 |
|---|---|---|---|---|---|---|---|---|---|---|---|---|
| 4 × 4   | 0 | 0 | 0 | 0 | 0 | 0 | 0 | 0 | 0 | 0 | 0 | 0 |
| 8 × 8   | 0 | 0 | 0 | 0 | 0 | 0 | 0 | 0 | 0 | 0 | 0 | 0 |
| 16 × 16 | 1 | 1 | 1 | 1 | 1 | 1 | 0 | 0 | 1 | 1 | 1 | 0 |
| 32 × 32 | 1 | 1 | 1 | 1 | 1 | 1 | 1 | 1 | 1 | 1 | 1 | 0 |
| 64 × 64 | 0 | 0 | 0 | 0 | 0 | 0 | 0 | 0 | 0 | 0 | 0 | 0 |

Upon obtaining the switch data from MDIS LUT at step 240, the method may proceed to step 250 and select the filtered buffer, which may comprise the filtered reference samples, or a non-filtered buffer that may comprise unfiltered reference samples. The selection may be made based on the filtering switch data obtained at step 240. The selection may then be used for intra prediction. As a result, by using the LUT of table 2 and/or 3, method 200 may not select filtered reference samples for 8×8 PU blocks that are associated with a directional prediction mode, and/or may not select filtered reference samples for 8×8 PU blocks that are associated with a planar prediction mode. At step 260, the method 200 may determine if a reference sample has been selected for all PU block. The method may end if all reference samples have been selected or return to step 230 if reference samples have not been selected for certain PUs.

Method 200 may result in decreased processing complexity and no loss of prediction accuracy (e.g. coding performance) in an All Intra high efficiency case, and negligible loss of prediction accuracy in an All Intra low complexity case. Specifically, the Bjontegaard Distortion (BD) rate may be 0.00% change on luma (Y), 0.02% gain on blue-difference chroma (Cb), 0.01% gain on red-difference chroma (Cr) for the All Intra high efficiency case and 0.05% loss on luma (Y), 0.03% gain on blue-difference chroma (Cb), 0.02% loss on red-difference chroma (Cr) for the All Intra low complexity case, repectively.

One skilled in the art will understand that method 200 may instead be implemented by determining whether to generate the filtered reference samples (e.g. whether to apply the filter) based on the filtering switch data in the LUT. Such embodiments may further simplify method 200 by reducing the number of generated filtered reference samples and are contemplated by the present disclosure.

Figure 3:
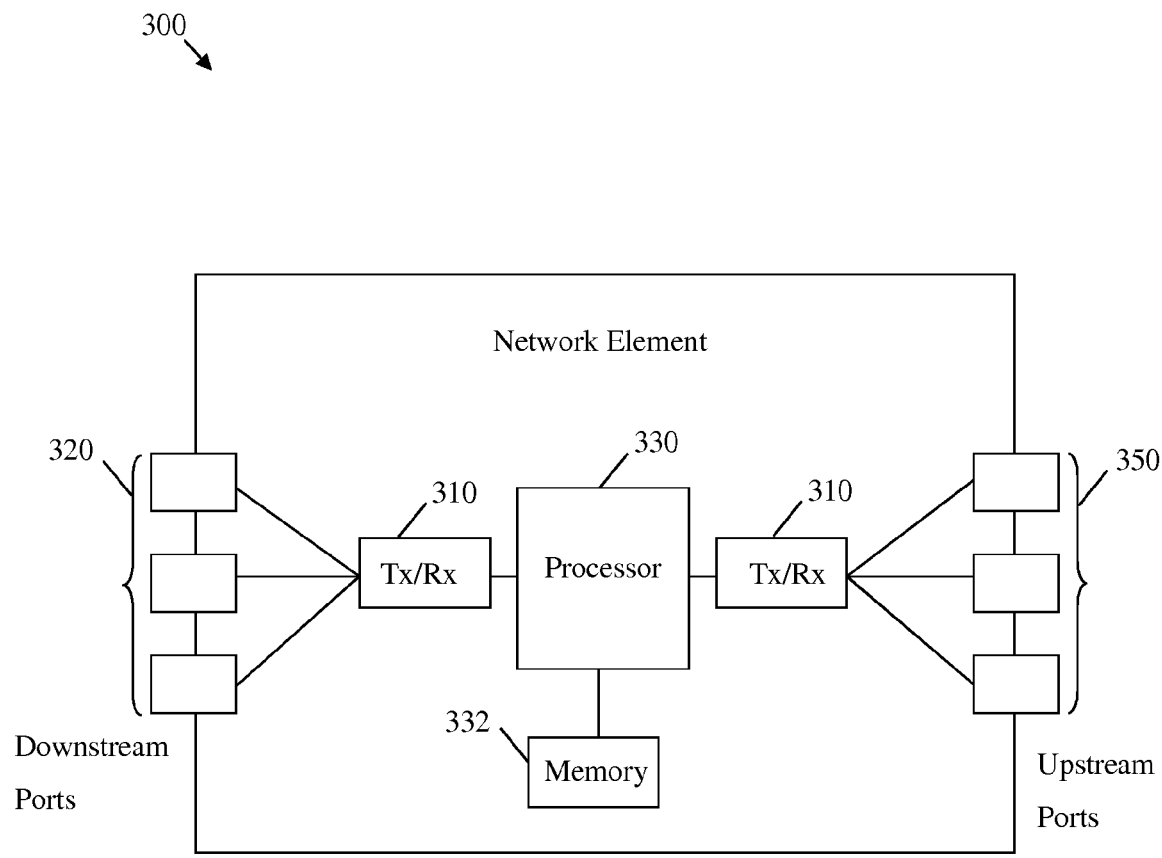
FIG. 3 is a schematic diagram of an embodiment of a network element.

FIG. 3 is a schematic diagram of an embodiment of a network element (NE) 300, which may comprise a processor or a video/image codec that processes images and predicts blocks as described above, e.g., within a network or system. For instance, the NE 300 may correspond to a media controller at an image transmitter and/or receiver. One skilled in the art will recognize that the term NE encompasses a broad range of devices of which NE 300 is merely an example. NE 300 is included for purposes of clarity of discussion, but is in no way meant to limit the application of the present disclosure to a particular NE embodiment or class of NE embodiments. At least some of the features/methods described in the disclosure, for example method of selecting a reference samples 200, may be implemented whole or in part in a network apparatus or component such as an NE 300. For instance, the features/methods in the disclosure may be implemented using hardware, firmware, and/or software installed to run on hardware. The NE 300 may be any device that transports frames through a network, e.g., a switch, router, bridge, server, a client, etc. As shown in FIG. 3, the NE 300 may comprise transceivers (Tx/Rx) 310, which may be transmitters, a receiver, or combinations thereof. A Tx/Rx 310 may be coupled to plurality of downstream ports 320 for transmitting and/or receiving frames from other nodes, a Tx/Rx 310 coupled to plurality of upstream ports 350 for transmitting and/or receiving frames from other nodes, and a processor 330 coupled to the Tx/Rxs 310 to process the frames and/or determine which nodes to send frames to. The processor 330 may comprise one or more multi-core processors and/or memory devices 332, which may function as data stores, buffers, etc. Processor 330 may be implemented as a general processor or may be part of one or more application specific integrated circuits (ASICs) and/or digital signal processors (DSPs). The downstream ports 320 and/or upstream ports 350 may contain electrical and/or optical transmitting and/or receiving components. NE 300 may or may not be a routing component that makes routing decisions.

It is understood that by programming and/or loading executable instructions onto the NE 300, at least one of the processor 330, downstream ports 320, Tx/Rxs 310, memory 332, and/or upstream ports 350 are changed, transforming the NE 300 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, Ru, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. The use of the term "about" means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of intra-frame prediction comprising:
generating a respective filtered reference sample for each of a plurality of prediction unit (PU) blocks by applying a smoothing filter to the PU block;
obtaining filtering switch data for each of the PU blocks from a Mode Dependent Intra Smoothing lookup table (MDIS LUT) based on a size and a prediction mode of the PU block, wherein the filtering switch data for PU blocks of size 8×8 and planar prediction mode indicates that an unfiltered reference sample should be used;
selecting, for each of the PU blocks, one of the filtered reference sample for the PU block or an unfiltered reference sample for the PU block based on the filtering switch data for the PU block; and
performing intra-frame prediction based on the selected samples, wherein a Bjontegaard Distortion rate that results from performing the prediction is approximately 0.00% change on luma (Y), approximately 0.02% gain on blue-difference chroma (Cb), approximately 0.01% gain on red-difference chroma (Cr) for the high efficiency case and approximately 0.05% loss on luma (Y), approximately 0.03% gain on blue-difference chroma (Cb), and approximately 0.02% loss on red-difference chroma (Cr) for the low complexity case.

2. The method of claim 1, wherein the reference samples are generated and selected as part of a video encoding process.

3. The method of claim 1, wherein the reference samples are generated and selected as part of a video decoding process.

4. The method of claim 1, wherein the reference samples are generated and selected as part of a High Efficiency Video Coding (HEVC) Mode Dependent Intra Smoothing (MDIS) process.

5. The method of claim 1, wherein the MDIS LUT comprises thirty six columns, wherein column 0 comprises data associated with planar mode, wherein column 1 comprises data associated with Intra DC mode, wherein columns 2-34 comprise data associated with directional intra mode, and wherein column 35 comprises data associated with intra LM mode.

6. The method of claim 5, wherein the MDIS LUT further comprises:
a plurality of rows associated with PU block sizes; and
a plurality of cells associating the rows to the columns, wherein each cell comprises a value of one to indicate that an intra smoothing filter should be applied to a PU block size or a value of zero to indicate that an intra smoothing filter should not be applied to a PU block size, and wherein the MDIS LUT is expressed as:

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 4 × 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8 × 8 | 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 × 16 | 1 | 0 | 0 | 0 | 1 | 1 | 1 | 1 | 1 | 1 | 1 | 1 | 1 | 1 | 1 | 1 | 1 | 1 | 1 | 1 | 1 | 1 | 0 | 0 |
| 32 × 32 | 1 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 64 × 64 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| | 24 | 25 | 26 | 27 | 28 | 29 | 30 | 31 | 32 | 33 | 34 | 35 |
|---|---|---|---|---|---|---|---|---|---|---|---|---|
| 4 × 4 | 0 | 0 | 0 | 0 | 0 | 0 | 0 | 0 | 0 | 0 | 0 | 0 |
| 8 × 8 | 0 | 0 | 0 | 0 | 0 | 0 | 0 | 0 | 0 | 0 | 0 | 0 |
| 16 × 16 | 1 | 1 | 1 | 1 | 1 | 1 | 0 | 0 | 1 | 1 | 1 | 0 |
| 32 × 32 | 1 | 1 | 1 | 1 | 1 | 1 | 1 | 1 | 1 | 1 | 1 | 0 |
| 64 × 64 | 0 | 0 | 0 | 0 | 0 | 0 | 0 | 0 | 0 | 0 | 0 | 0 |

7. The method of claim 5, wherein the MDIS LUT further comprises:
a plurality of rows associated with PU block sizes; and
a plurality of cells associating the rows to the columns, wherein each cell comprises a value of one to indicate that an intra smoothing filter should be applied to a PU block size or a value of zero to indicate that an intra smoothing filter should not be applied to a PU block size, and
wherein the MDIS LUT is expressed as:

| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|---|
| 4 × 4 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 8 × 8 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |
| 16 × 16 | 1 | 0 | 0 | 0 | 1 | 1 | 1 | 1 | 1 | 1 | 1 | 1 | 1 | 1 | 1 | 1 | 1 | 1 | 1 | 1 | 1 | 1 | 0 | 0 |
| 32 × 32 | 1 | 0 | 0 | 0 | 1 | 1 | 1 | 1 | 1 | 1 | 1 | 1 | 1 | 1 | 1 | 1 | 1 | 1 | 1 | 1 | 1 | 1 | 1 | 1 |
| 64 × 64 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 |

| | 24 | 25 | 26 | 27 | 28 | 29 | 30 | 31 | 32 | 33 | 34 | 35 |
|---|---|---|---|---|---|---|---|---|---|---|---|---|
| 4 × 4 | 0 | 0 | 0 | 0 | 0 | 0 | 0 | 0 | 0 | 0 | 0 | 0 |
| 8 × 8 | 0 | 0 | 0 | 0 | 0 | 0 | 0 | 0 | 0 | 0 | 0 | 0 |
| 16 × 16 | 1 | 1 | 1 | 1 | 1 | 1 | 0 | 0 | 1 | 1 | 1 | 0 |
| 32 × 32 | 1 | 1 | 1 | 1 | 1 | 1 | 1 | 1 | 1 | 1 | 1 | 0 |
| 64 × 64 | 0 | 0 | 0 | 0 | 0 | 0 | 0 | 0 | 0 | 0 | 0 | 0 |

8. A system for intra-frame prediction comprising:
a memory device comprising a mode dependent Intra smoothing lookup table (MDIS LUT) and instructions;
a processor coupled to the memory device that executes the instructions to:
generates a respective filtered reference samples for each of a plurality of prediction unit (PU) blocks by applying a smoothing filter to the PU block;
obtain filtering switch data for each of the PU blocks from the MDIS LUT based on a size and a prediction mode of the PU block, wherein the filtering switch data for PU blocks of size 8×8 and planar prediction mode indicates that an unfiltered reference sample should be used;
select, for each of the PU blocks, one of the filtered reference sample for the PU block or an unfiltered reference sample for the PU block based on the filtering switch data for the PU block; and
perform intra-frame prediction based on the selected samples, wherein a Bjontegaard Distortion rate that results from performing the prediction is approximately 0.00% change on luma (Y), approximately 0.02% gain on blue-difference chroma (Cb), approximately 0.01% gain on red-difference chroma (Cr) for the high efficiency case and approximately 0.05% loss on luma (Y), approximately 0.03% gain on blue-difference chroma (Cb), and approximately 0.02% loss on red-difference chroma (Cr) for the low complexity case.

9. The system of claim 8, wherein the reference samples are generated and selected as part of a video encoding process.

10. The system of claim 8, wherein the reference samples are generated and selected as part of a video decoding process.

11. The system of claim 8, wherein the reference samples are generated and selected as part of a High Efficiency Video Coding (HEVC) Mode Dependent Intra Smoothing (MDIS) process.

12. The system of claim 8, wherein the MDIS LUT comprises thirty six columns, wherein column 0 comprises data associated with planar mode, wherein column 1 comprises data associated with Intra DC mode, wherein columns 2-34 comprise data associated with directional intra mode, and wherein column 35 comprises data associated with intra LM mode.

13. The system of claim 8, wherein the MDIS LUT further comprises:
a plurality of rows associated with PU block sizes; and
a plurality of cells associating the rows to the columns, wherein each cell comprises a value of one to indicate that an intra smoothing filter should be applied to a PU block size or a value of zero to indicate that an intra smoothing filter should not be applied to a PU block size, and wherein the MDIS LUT is expressed as:

|        | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|--------|---|---|---|---|---|---|---|---|---|---|----|----|----|----|----|----|----|----|----|----|----|----|----|----|
| 4 × 4   | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  |
| 8 × 8   | 1 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  |
| 16 × 16 | 1 | 0 | 0 | 0 | 1 | 1 | 1 | 1 | 1 | 1 | 1  | 1  | 1  | 1  | 1  | 1  | 1  | 1  | 1  | 1  | 1  | 1  | 0  | 0  |
| 32 × 32 | 1 | 0 | 0 | 0 | 1 | 1 | 1 | 1 | 1 | 1 | 1  | 1  | 1  | 1  | 1  | 1  | 1  | 1  | 1  | 1  | 1  | 1  | 1  | 1  |
| 64 × 64 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  |

|         | 24 | 25 | 26 | 27 | 28 | 29 | 30 | 31 | 32 | 33 | 34 | 35 |
|---------|----|----|----|----|----|----|----|----|----|----|----|----|
| 4 × 4   | 0  | 0  | 0  | 0  | 0  | 0  | 0  | 0  | 0  | 0  | 0  | 0  |
| 8 × 8   | 0  | 0  | 0  | 0  | 0  | 0  | 0  | 0  | 0  | 0  | 0  | 0  |
| 16 × 16 | 1  | 1  | 1  | 1  | 1  | 1  | 0  | 0  | 1  | 1  | 1  | 0  |
| 32 × 32 | 1  | 1  | 1  | 1  | 1  | 1  | 1  | 1  | 1  | 1  | 1  | 0  |
| 64 × 64 | 0  | 0  | 0  | 0  | 0  | 0  | 0  | 0  | 0  | 0  | 0  | 0  |

14. The system of claim 8, wherein the MDIS LUT further comprises:
   a plurality of rows associated with PU block sizes; and
   a plurality of cells associating the rows to the columns,
   wherein each cell comprises a value of one to indicate that an intra smoothing filter should be applied to a PU block size or a value of zero to indicate that an intra smoothing filter should not be applied to a PU block size, and
   wherein the MDIS LUT is expressed as:

|        | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|--------|---|---|---|---|---|---|---|---|---|---|----|----|----|----|----|----|----|----|----|----|----|----|----|----|
| 4 × 4   | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  |
| 8 × 8   | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  |
| 16 × 16 | 1 | 0 | 0 | 0 | 1 | 1 | 1 | 1 | 1 | 1 | 1  | 1  | 1  | 1  | 1  | 1  | 1  | 1  | 1  | 1  | 1  | 1  | 0  | 0  |
| 32 × 32 | 1 | 0 | 0 | 0 | 1 | 1 | 1 | 1 | 1 | 1 | 1  | 1  | 1  | 1  | 1  | 1  | 1  | 1  | 1  | 1  | 1  | 1  | 1  | 1  |
| 64 × 64 | 0 | 0 | 0 | 0 | 0 | 0 | 0 | 0 | 0 | 0 | 0  | 0  | 0  | 0  | 0  | 0  | 0  | 0  | 0  | 0  | 0  | 0  | 0  | 0  |

|         | 24 | 25 | 26 | 27 | 28 | 29 | 30 | 31 | 32 | 33 | 34 | 35 |
|---------|----|----|----|----|----|----|----|----|----|----|----|----|
| 4 × 4   | 0  | 0  | 0  | 0  | 0  | 0  | 0  | 0  | 0  | 0  | 0  | 0  |
| 8 × 8   | 0  | 0  | 0  | 0  | 0  | 0  | 0  | 0  | 0  | 0  | 0  | 0  |
| 16 × 16 | 1  | 1  | 1  | 1  | 1  | 1  | 0  | 0  | 1  | 1  | 1  | 0  |
| 32 × 32 | 1  | 1  | 1  | 1  | 1  | 1  | 1  | 1  | 1  | 1  | 1  | 0  |
| 64 × 64 | 0  | 0  | 0  | 0  | 0  | 0  | 0  | 0  | 0  | 0  | 0  | 0  |

\* \* \* \* \*